United States Patent [19]
Mott

[11] Patent Number: 5,988,360
[45] Date of Patent: Nov. 23, 1999

[54] REPLACEMENT SLIDER BAR ADAPTER ASSEMBLY

[75] Inventor: George T. Mott, Alburtis, Pa.

[73] Assignee: Asgco Manufacturing, Inc., Allentown, Pa.

[21] Appl. No.: 08/942,085

[22] Filed: Oct. 1, 1997

Related U.S. Application Data

[60] Provisional application No. 60/027,340, Oct. 1, 1996.

[51] Int. Cl.$^6$ .................................................. B65G 15/08
[52] U.S. Cl. ........................................... 198/823; 198/841
[58] Field of Search ..................................... 198/841, 823, 198/837, 822, 861.1

[56] References Cited

U.S. PATENT DOCUMENTS

| | | |
|---|---|---|
| 2,427,590 | 9/1947 | Conners . |
| 2,818,966 | 1/1958 | Gill . |
| 3,259,227 | 7/1966 | Steinmetz . |
| 3,332,536 | 7/1967 | Ebly et al. . |
| 3,942,626 | 3/1976 | Wilding . |
| 4,280,619 | 7/1981 | Ward et al. ............................. 198/823 |
| 4,557,341 | 12/1985 | Soderholm . |
| 4,793,470 | 12/1988 | Anderson ................................ 198/841 |
| 4,898,272 | 2/1990 | Swinderman et al. .................. 198/841 |
| 5,193,663 | 4/1993 | Kuroda . |
| 5,251,742 | 10/1993 | Campbell . |
| 5,350,053 | 9/1994 | Archer . |
| 5,467,866 | 11/1995 | Swinderman . |

FOREIGN PATENT DOCUMENTS

| | | | |
|---|---|---|---|
| 1424796 | 2/1976 | United Kingdom ................... 198/823 |

*Primary Examiner*—William E. Terrell
*Assistant Examiner*—Khoi H. Tran
*Attorney, Agent, or Firm*—Stephen H. Eland; Dann, Dorfman, Herrell and Skillman

[57] ABSTRACT

A load zone area of a conveyor system which includes a continuous belt which carries bulk materials such as stone, ore, grain, etc. to a discharge point where the material leaves the belt as the belt wraps around a head pulley and returns along the under side of the conveyor system to a tail pulley which brings the belt back to a point which it can be loaded again. The load zone area typically has multiple support rollers closely spaced together to minimize the effect of the material impacting the belt which deflects the belt downward, thus creating a gap between the belt and the skirt seal causing leakage. The existing rollers normally have three rollers which form a "U" shape trough for the belt the two "wing" rollers are removed from the existing troughing roller assembly and replaced by a steel adapter to which a low friction rail may be attached longitudinally to the direction the belt moves, thus reducing the downward deflection of the belt where the material being loaded on to the belt is impacting the belt, and avoiding the gaps between the belt and the skirt seals.

9 Claims, 5 Drawing Sheets

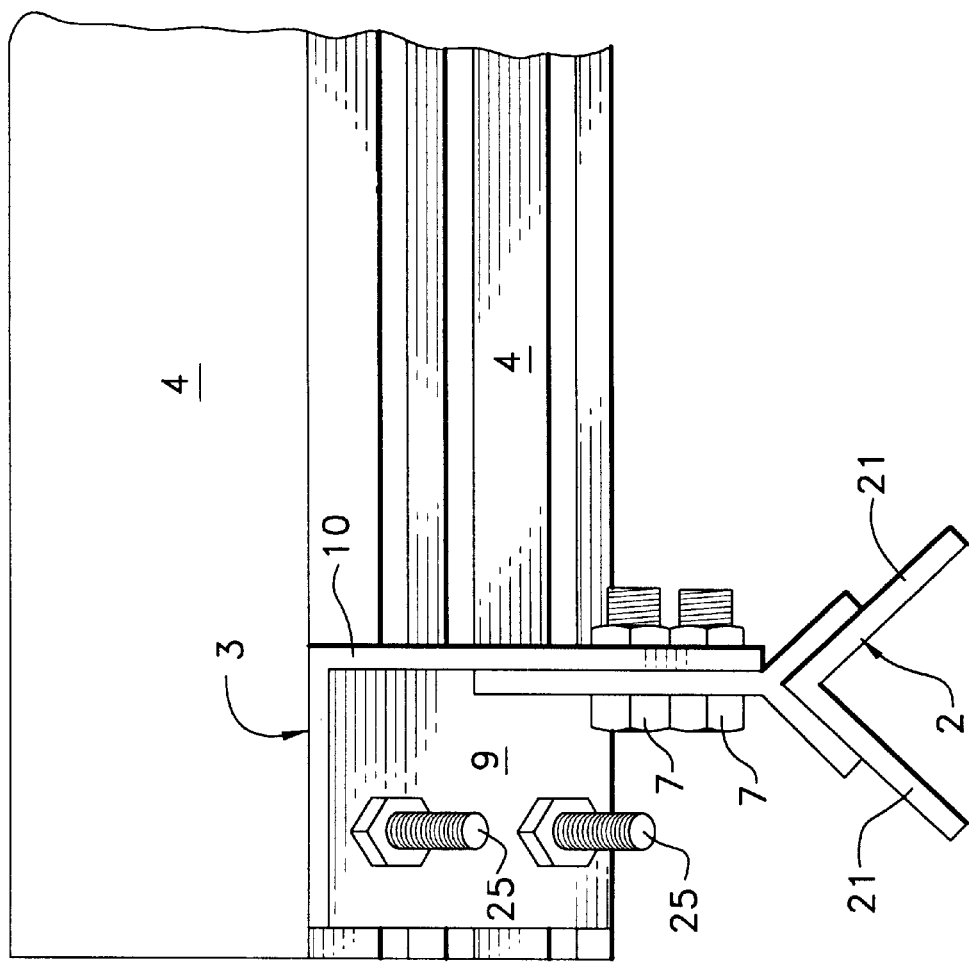

REPLACEMENT SLIDER BAR ADAPTER ASSEMBLY

This application claims benefit of provisional application No. 60/027,340 filed Oct. 1, 1996.

FIELD OF THE INVENTION

The present invention relates to conveyor systems, and more particularly to conveyor systems using a flat conveyor belt which has its marginal side portions deflected upwardly to form a troughed configuration in the load zone of the system.

BACKGROUND OF THE INVENTION

Prior Art teaches several methods of supporting the conveyor belt as it moves through the load zone and is being loaded, the most common approach is to utilize the same type of supporting rollers used on the rest of the belt except that they are spaced as close together as possible.

Another approach is to entirely replace the support rollers with a slider bed which utilizes low friction slider bars to replace all three of the rollers in a common troughing idler.

Another method of supporting the belt is the subject of the present invention, a combination of standard troughing rollers and a slider bed in which the center roller is retained and the wing or side rollers are replaced with a steel adapter that permits mounting of a low friction bar longitudinally to the direction of belt travel.

Archer U.S. Pat. No. 5,350,053 teaches the use of a replacement kit which utilizes an angle iron with a round pin that engages the slot where the wing roller was removed, to replace the belt support wing rollers. The individual troughing idlers are then tied together with an elongated C-shaped steel rail preferably the full length of the load zone which provides the support for a low friction bar for the belt to slide on. This arrangement can be very damaging to the belt if the relatively thin slider bar wears out and the belt comes into engagement with the elongated steel C-shaped support rail.

SUMMARY OF THE INVENTION

In the present patent the wing roller is replaced by a double angle iron support member which is supported by the existing trougher cross frame, the double angle is adjustable to accommodate different roll diameter heights. The double angle permits the attachment of the ends of adjacent longitudinal low friction bars to a single adapter for alignment purposes. One or more bars are attached to multiple double angle adapters to complete the load zone area. Solid low friction bars 3" (more or less) thick are then mounted to the double angle adapters. The thickness of the bars provides a measure of safety to the belt because the bars can wear to a point where the belt becomes self supporting before the belt comes in contact with the steel. The bars are mounted using a standard round head carriage bolt engaged in a longitudinal "Tee" shaped slot running longitudinally in the low friction bar. The width of the slot where it engages the square under the round head of the carriage bolt is designed to allow the square to turn, deforming the UHMW polyethylene material of the slider bar, at the maximum torque for tightening the bolts.

BRIEF DESCRIPTION OF THE DRAWINGS

FIG. 6 is a side elevational view of the adapter bracket shown in FIG. 2.

DESCRIPTION OF THE PREFERRED EMBODIMENT

Figure 1:
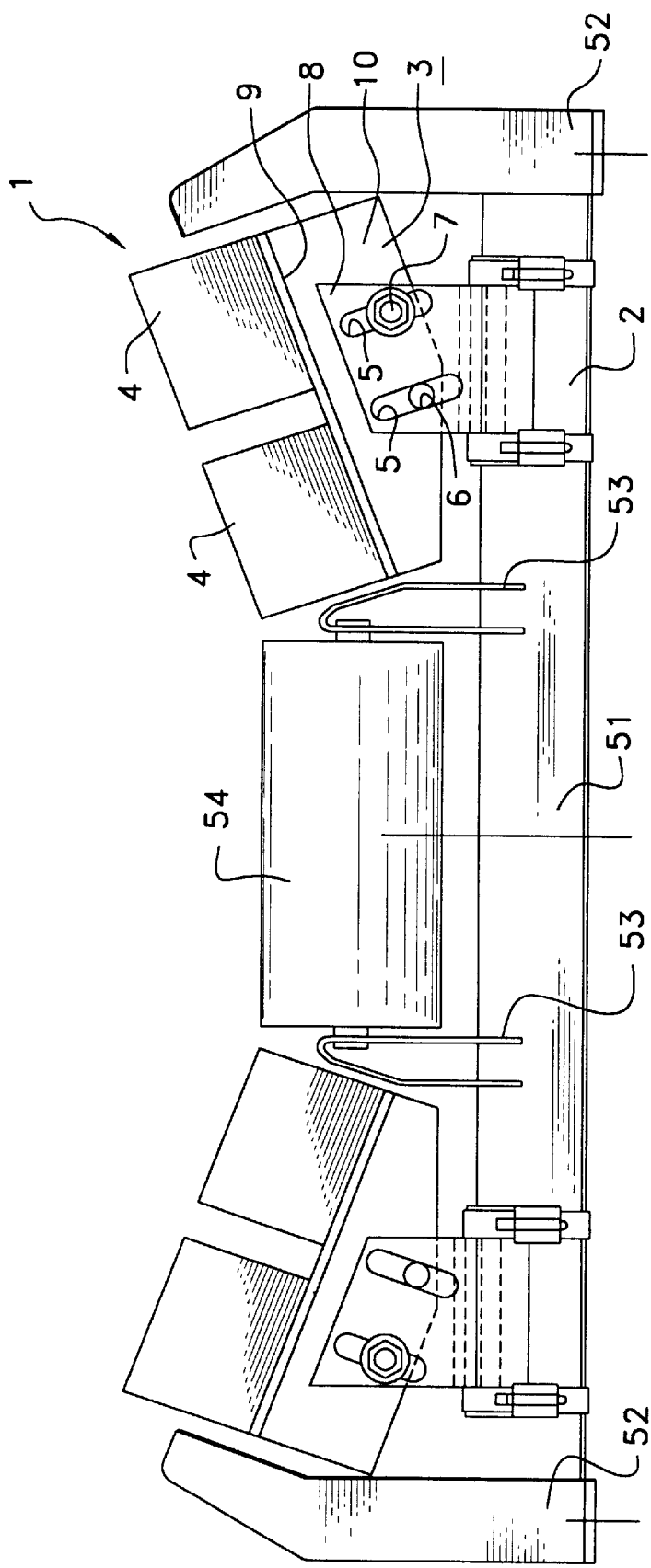
FIG. 1 shows a typical conveyor trougher frame with the wing rollers removed and slider bar adapter brackets installed on the main trougher cross frame.
Figure 2:
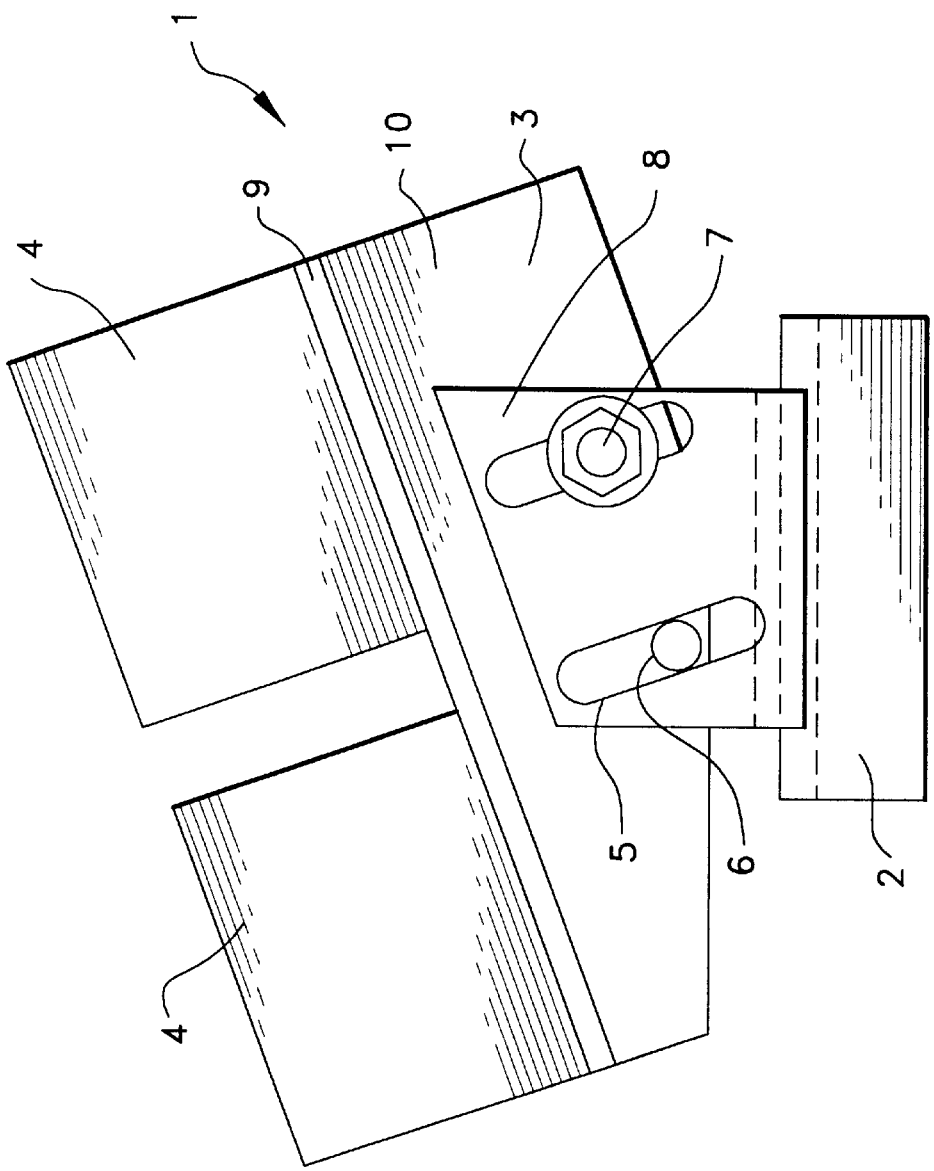
FIG. 2 shows the adapter bracket shown in FIG. 1.

Referring to FIGS. 1 and 2, the adapter assembly 1 is mounted in the load zone area of a conveyor system. The existing conveyor system normally includes a conveyor belt trained about a head pulley and a tail pulley having parallel axes, and a series of transverse angle cross members 51 extending parallel to one another and to the axes of the head and tail pulley under the full width of the belt. Upright stanchions 52 are provided at the opposite ends of the transverse angle cross members and intermediate stanchions 53 are positioned along the opposite sides of the central zone of the conveyor belt.

Wing rollers (not shown) are normally journaled for rotation about tilted axes between the outermost stanchions 52 and the adjacent intermediate stanchions 53. The wing rollers deflect the outer marginal portions of the belt upwardly so as to form a trough for the reception of the load material coming in to the load zone area. Skirt boards cooperate with the troughed conveyor belt to confine the incoming load material to the troughed belt. As noted above, the use of wing rollers along the outer sides of the trough belt often permits the load material to escape from the troughed belt through gaps which appear between the skirt seal and the undulating portion of the belt which results from the use of longitudinally spaced roller elements thereunder to deflect the marginal portions of the conveyor belt into its troughed condition.

In accordance with the present invention the wing rollers are removed from between the stanchions 52 and 53 and a slider bar adapter assembly 1 is mounted on the transverse angles 51 in the end lengths between the stanchions 52 and 53 so as to support one or more slider bars which may extend along the length of the conveyor in the load zone area.

Each slider bar adapter assembly includes a base component 2 which conforms to the transverse angled member 51 and is mounted on the angled member 51 at the desired position between the stanchions 52 and 53. The base 2 conforms in contour to the angled member 51 and is adapted to be clamped at the desired position therealong. The base 2 has an upstanding support plate 8 having a pair of mounting slots 5,5 which have longitudinal axes extending generally perpendicular to the axes of the wing rollers which were mounted between the stanchions 52 and 53. Different support plates are provided to accommodate replacement of wing rollers tilted at different angles from that shown in FIGS. 1 and 2. Each support plate 8 adjustably supports slider-bar-mounting angle elements 3 having an upright web 10 and an outwardly projecting flange 9. The mounting element webs 10 have mounting holes 6 adapted to receive mounting bolts 7 which penetrate the holes 6 and the slots 5. The bolts 7 afford adjustment of the slider bar supports 3 along the longitudinal axes of the slots 5,5 to accommodate replacement of rollers of differing diameters.

Figure 3:
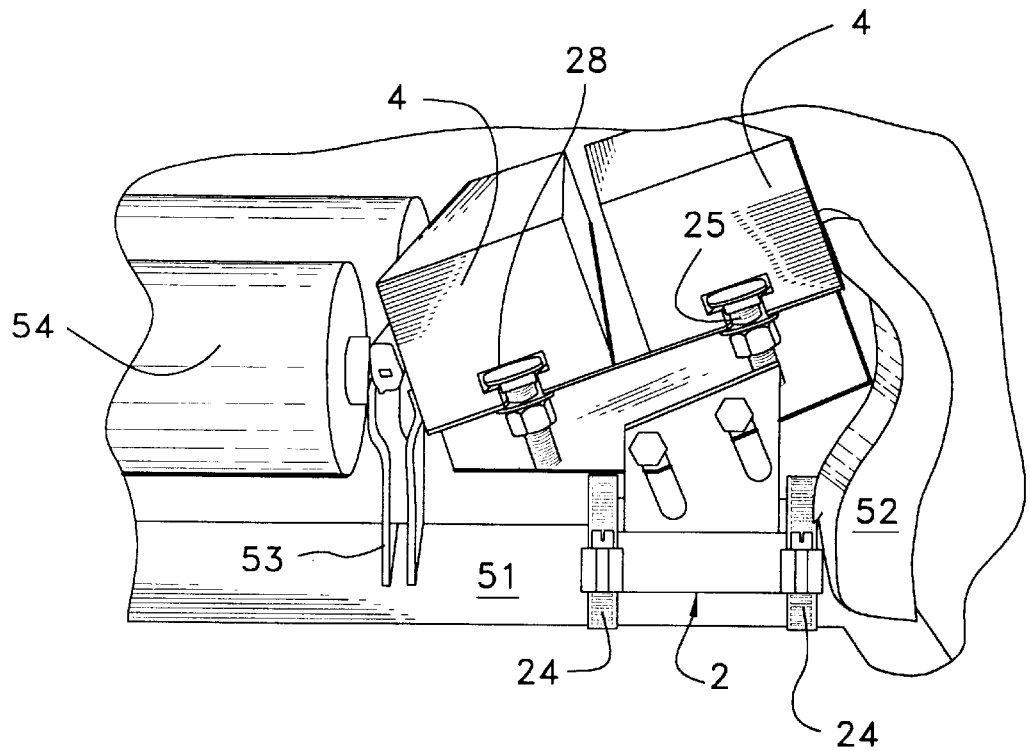
FIG. 3 is an end view showing the slider bars mounted on an adapter bracket installed on an existing cross frame of a conveyor system.
Figure 4:
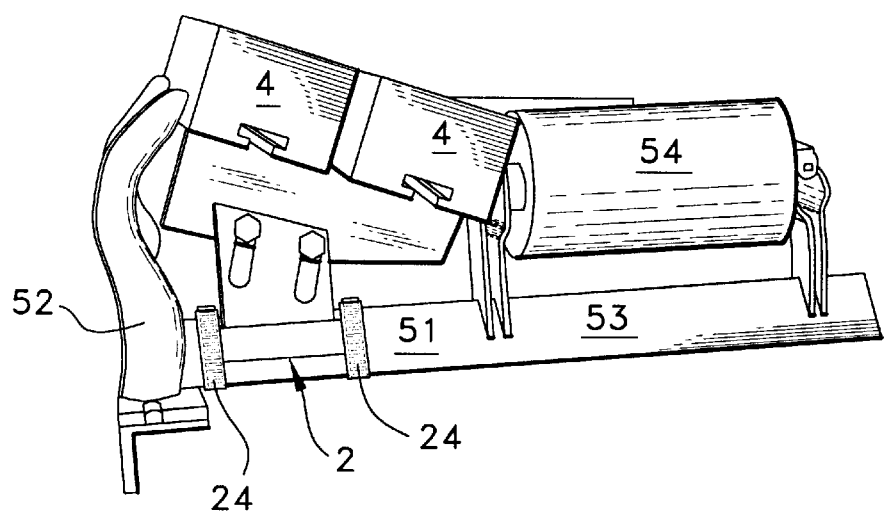
FIG. 4 is a perspective view showing the slider bars in relation to the central support rollers.
Figure 5:
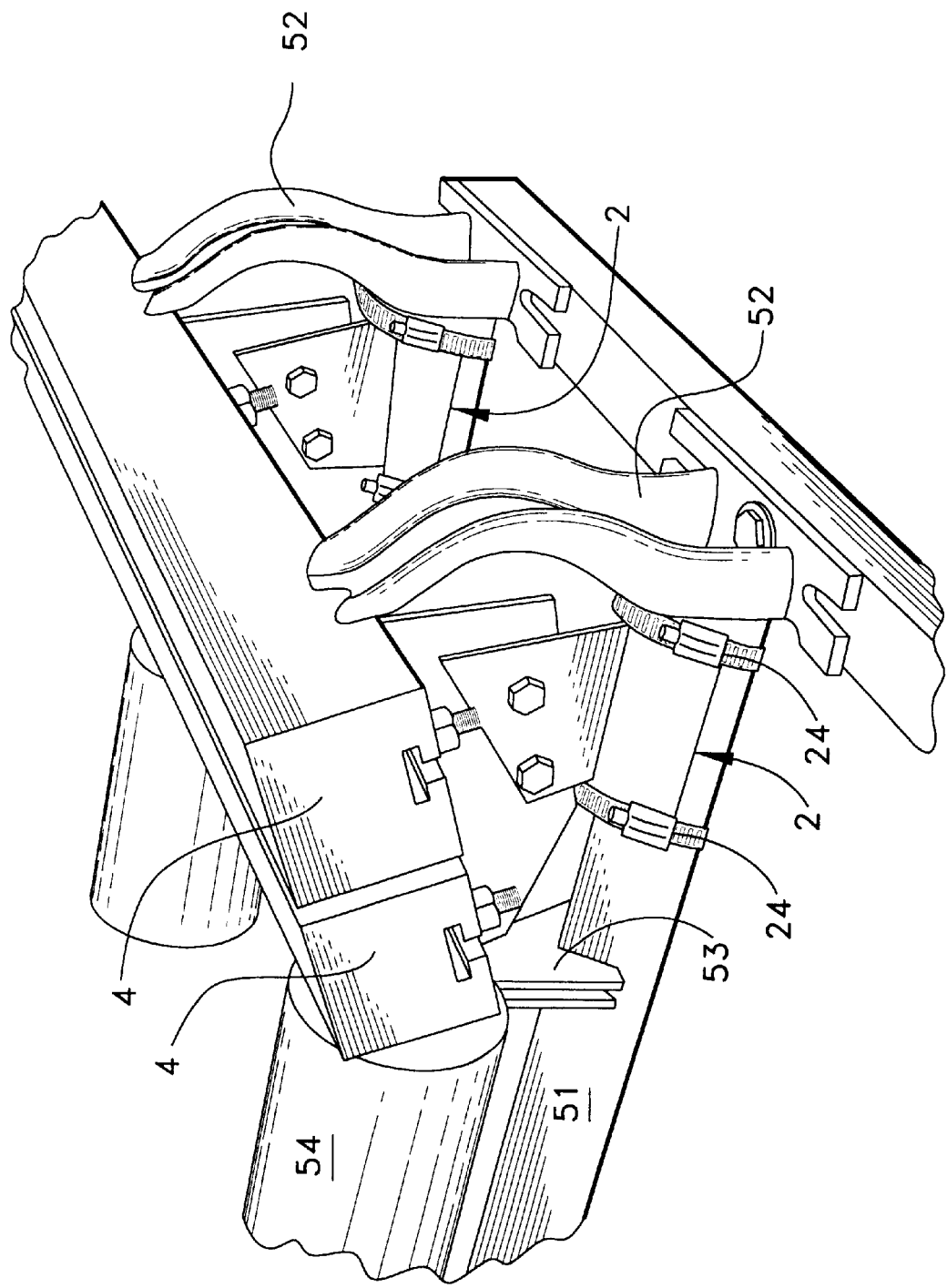
FIG. 5 is a perspective view, as seen from the end of the cross frame.

The slider bars 4 are replaceably mounted on the slider bar supports 3 by T-slots in the under surface of the bar which receive anchor bolts (not shown in FIGS. 1 and 2, but shown in FIGS. 3–5) which extend through the perpendicular flange 9 extending from the support plate web 10. The T-slot in the bottom of each slider bar extends throughout the entire length of the slider bar so that the slider bar may be replaced without lifting the belt. The slider may be a one piece structure, preferably of a UHMW formulation of polyethylene. Alternatively, the slider bar may be modified to provide a high impact bar by laminating the UHMW polyethylene onto a rubber base.

In the illustrated embodiment, the slider bars are positioned along the outer marginal portions of the conveyor belt to prevent gaps in the load zone of the conveyor system. It is contemplated that in certain installations the support rollers 54 between the intermediate stanchions 53 may also be removed and replaced with slider bar assemblies.

In the illustrated embodiment, the base component 2 of the assembly comprises an angle iron having downwardly depending legs 21,21 straddling and mating with the angle cross member 51, so that the cross member nests within the base component 2. The angular form of the mating components permits the base component 2 to be displaced for adjustment along the length of the cross member between the outer stanchion 52 and the intermediate stanchion 53. Fasteners are provided at 24, 24 to anchor the component 2 in its adjusted position. Adjustment is normally required only during initial installation and replacement of worn slider bars.

During replacement of worn slider bars, the components 2 may be adjusted toward the outermost stanchions 52, which moves the slider bars 4 outwardly away from the underside of the belt. The mounting bolts 7 need not be disturbed, unless it is desired to change the angle at which the slider bars support the marginal portions of the troughed belt. The anchor bolts 25 which engage in the T-slots 28 in the bottom of the slider bars and serve to anchor the bars to the flange 9 may be loosened, and since the T-slots 28 extend the full length of the bar, the worn slider bars 4 may then be disengaged from the supports 3 by sliding the bars along their longitudinal axis. Replacement slider bars may then be engaged on the supports by sliding the replacement bars longitudinally into place, engaging the anchor bolts 25 in the T-slot of each replacement bar 4. To facilitate tightening and loosening the anchor bolts 25, the bolts comprise standard carriage bolts having a rounded head to slide in the cross base of the T-slot, and a square shank below the head to hold the bolt against rotation when engaged in the T-slot. The width of the T-slot where it engages the square shank causes the shank to deform the polyethylene material of the slider bar at the maximum torque for tightening the bolt.

When the slider bar is subjected to wear by travel of the belt against its exposed surface, there is nothing in the slider bar which may damage the belt as the bar wears down. In the case of extreme inattentiveness to wear, if the bar wears down to the T-slot, the belt will be exposed only to the rounded head of the clamping bolt 25.

While these particular embodiments of the present invention have been herein illustrated and described it is not intended to limit the invention to such disclosures.

I claim:

1. A slider bar and support for a troughing conveyor system having a continuous belt trained about head and tail pulleys having parallel turning axes, and a series of transverse cross members, said transverse cross members having a length extending across and below the width of said belt, and having an end length underlying each of the marginal edges of said belt, said support having a base engagingly mating with said transverse cross members, a base connection mounting said base on one of said end lengths, a support plate extending upright from said base, a mounting element for said slider bar, and a mounting connection for mounting said mounting element on said support plate, said slider bar being adapted to be mounted on said mounting element along the length of the marginal edges of said conveyor belt, said slider bar having a T-slot extending throughout its entire length, and confronting said mounting element, and including a clamping bolt having a head, a shank, and a fastener, said head and shank engaging said T-slot, and said fastener clamping said bar to said mounting element, at least one of said base connection and said mounting connection being adjustable to afford displacement of said mounting element and said slider bar toward and away from said marginal edges of the belt.

2. A slider bar and support according to claim 1, said base comprising an angle member mating with said transverse cross member for sliding displacement along the end length thereof, said base connection comprising a releasable fastener for securing said angle member to said cross member, said fastener enabling displacement of said base longitudinally of said end length.

3. A slider bar and support according to claim 1, one of said support plate and said mounting element having slotted openings extending in a direction generally perpendicular to said slider bar, the other of said support plate and mounting element mounting a releasable fastener engaging in said slot to comprise said mounting connection, said releasable fastener enabling displacement of said slider bar in said perpendicular direction toward and away from said marginal edges of the belt.

4. A slider bar and support according to claim 1 wherein said series of transverse cross members includes at least two cross members spaced apart and parallel to one another and to said turning axes, said support comprising at least two bases each having a connection mounting said base on one of said spaced apart cross members, a support plate on each said base and a mounting element on each said support plate, said slider bar being mounted to span between said mounting elements, and having a clamping bolt engaging in said T-slot for each of said mounting elements, said two clamping bolts being releasable to enable disassembly of said slider bar from said mounting elements by longitudinal displacement of said slider bar.

5. A slider bar and slider bar support for a troughing conveyor system having a continuous belt, and a series of cross members transverse the length of the belt underlying at least one marginal edge of the belt, comprising:

a longitudinally elongated slider bar disposed parallel to the length of the belt;

a base member adapted to engagingly mate with one of the cross members;

a support plate extending upright from the base member;

a first connector connecting the slider bar with the support plate; and a second connector removably connecting the base member to the one cross member;

wherein the slider bar is vertically adjustable relative to the base member.

6. The apparatus of claim 5 wherein the second connector is adjustable to permit the base member to move relative to the cross member along the length of the cross member.

7. The apparatus of claim 5 wherein the first connector releasably connects the slider bar with the support plate.

8. The apparatus of claim 5 wherein the cross member includes a transverse edge facing upward and two transverse surfaces sloping downward away from the transverse edge, and wherein said base member conforms to the transverse edge and transverse surfaces of the cross member.

9. The apparatus of claim 5 wherein the base member mates with the one cross member between first and second stanchions attached to the cross member.

* * * * *